US010618166B2

(12) United States Patent
Kokubo

(10) Patent No.: US 10,618,166 B2
(45) Date of Patent: Apr. 14, 2020

(54) TEACHING POSITION CORRECTION DEVICE AND TEACHING POSITION CORRECTION METHOD

(71) Applicant: FANUC CORPORATION, Yamanashi (JP)

(72) Inventor: Kyouhei Kokubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 117 days.

(21) Appl. No.: 15/959,690

(22) Filed: Apr. 23, 2018

(65) Prior Publication Data

US 2018/0345493 A1 Dec. 6, 2018

(30) Foreign Application Priority Data

Jun. 6, 2017 (JP) .................................. 2017-111562

(51) Int. Cl.
*B25J 9/16* (2006.01)

(52) U.S. Cl.
CPC ........... *B25J 9/1653* (2013.01); *B25J 9/1697* (2013.01); *Y10S 901/03* (2013.01); *Y10S 901/47* (2013.01)

(58) Field of Classification Search
CPC ..... B25J 9/1653; B25J 9/1697; Y10S 901/03; Y10S 90/47
See application file for complete search history.

(56) References Cited

U.S. PATENT DOCUMENTS

| 4,831,547 A | * | 5/1989 | Ishiguro | ................. B25J 9/0096 318/568.19 |
| 4,879,664 A | * | 11/1989 | Suyama | .................... G06T 7/73 700/186 |

(Continued)

FOREIGN PATENT DOCUMENTS

| CN | 106113050 A | 11/2016 |
| CN | 106346483 A | 1/2017 |

(Continued)

OTHER PUBLICATIONS

Japanese Office Action dated Feb. 5, 2019, in connection with corresponding JP Application No. 2017-111562 (4 pgs., including machine-generated English translation).

(Continued)

*Primary Examiner* — Nicholas Kiswanto
(74) *Attorney, Agent, or Firm* — Maier & Maier, PLLC

(57) ABSTRACT

Provided is a teaching position correction device including a vision sensor attached to a tip end of an arm of a robot; a measurement unit measuring a three-dimensional position of the tip end of the robot when the sensor is arranged at a predetermined position with respect to each of reference points provided on an object or a holding device and not arranged on one straight line; and a calculation unit calculating relative positions of the reference points based on the measured three-dimensional position while the sensor is translated, where a teaching point position in an operation program of the robot is corrected in such a way that a change in relative positions of the robot and the holding device is compensated for, based on the relative positions of the reference points calculated before and after relocation of at least one of the robot and the holding device.

9 Claims, 4 Drawing Sheets

(56) References Cited

U.S. PATENT DOCUMENTS

| | | | | |
|---|---|---|---|---|
| 5,006,999 | A * | 4/1991 | Kuno | G05B 19/425 |
| | | | | 219/124.34 |
| 5,371,836 | A * | 12/1994 | Mitomi | G05B 19/4182 |
| | | | | 700/245 |
| 5,572,103 | A * | 11/1996 | Terada | B25J 9/1656 |
| | | | | 318/568.11 |
| 2005/0102060 | A1 | 5/2005 | Watanabe et al. | |
| 2005/0107920 | A1 | 5/2005 | Ban et al. | |
| 2008/0300723 | A1 | 12/2008 | Ban et al. | |
| 2011/0029131 | A1 | 2/2011 | Ban et al. | |
| 2014/0156072 | A1 | 6/2014 | Ban et al. | |
| 2016/0288333 | A1 * | 10/2016 | Yamaguchi | B25J 9/1697 |
| 2016/0354929 | A1 * | 12/2016 | Ishige | B25J 9/1697 |
| 2016/0361818 | A1 * | 12/2016 | Hiruma | B25J 9/1692 |
| 2017/0014995 | A1 | 1/2017 | Kato | |
| 2017/0057088 | A1 | 3/2017 | Watanabe et al. | |
| 2017/0368687 | A1 | 12/2017 | Huang et al. | |
| 2018/0004188 | A1 * | 1/2018 | Yamaguchi | B25J 9/1697 |
| 2018/0009105 | A1 * | 1/2018 | Kutsukake | B25J 9/0084 |
| 2018/0222049 | A1 * | 8/2018 | Suzuki | B25J 9/1692 |
| 2019/0160682 | A1 * | 5/2019 | Sato | B25J 9/162 |

FOREIGN PATENT DOCUMENTS

| | | |
|---|---|---|
| CN | 106476011 A | 3/2017 |
| EP | 1 530 107 A2 | 5/2005 |
| EP | 1533671 A1 | 5/2005 |
| JP | 10-049218 A | 2/1998 |
| JP | 2005-138223 A | 6/2005 |
| JP | 2005-149299 A | 6/2005 |
| JP | 2010-076054 A | 4/2010 |
| JP | 4763074 B2 | 8/2011 |
| JP | 2016-013608 A | 1/2016 |

OTHER PUBLICATIONS

Japanese Search Report submitted to the JPO dated Jan. 10, 2019, in connection with corresponding JP Application No. 2017-111562 (19 pgs., including machine-generated English translation).

Chinese Office Action dated Dec. 9, 2019, in connection with corresponding CN Application No. 201810557468.9 (15 pgs., including machine-generated English translation).

* cited by examiner

TEACHING POSITION CORRECTION DEVICE AND TEACHING POSITION CORRECTION METHOD

CROSS-REFERENCE TO RELATED APPLICATIONS

This application claims the benefit of Japanese Patent Application No. 2017-111562, the content of which is incorporated herein by reference.

FIELD

The present invention relates to a teaching position correction device, and a teaching position correction method.

BACKGROUND

Conventionally, there is known a teaching position correction device in a robot system which is configured to work on a work target object by using a robot, the teaching position correction device being for correcting a teaching position in a case where at least one of the robot and a holding device holding a work target object is relocated, so that an operation program which was taught before relocation can be used also after the relocation (for example, see Japanese Unexamined Patent Application, Publication No. 2005-149299).

SUMMARY

An aspect of the present invention provides a teaching position correction device including a vision sensor, attached to a tip end of an arm of a robot, that acquires visual information, a position measurement unit that measures a three-dimensional position of the tip end of the robot based on the visual information acquired by the vision sensor when the vision sensor is arranged at a predetermined position with respect to each of three or more reference points that are provided on one of a work target object to be worked by the robot and a holding device that holds the work target object and that are not arranged on one straight line, and a relative position calculation unit that calculates a relative position, with respect to one of the reference points, of each of other reference points, based on the three-dimensional position that is measured by the position measurement unit while the vision sensor is translated by operation of the robot, where a teaching point position in an operation program of the robot is corrected in such a way that a change in relative positions of the robot and the holding device is compensated for, based on relative positions of the reference points calculated by the relative position calculation unit before and after relocation of at least one of the robot and the holding device.

Moreover, another aspect of the present invention provides a teaching position correction method including a first step, before relocation of at least one of a robot and a holding device that holds a work target object that is to be worked by the robot, of measuring a three-dimensional position of a tip end of the robot based on visual information acquired, by a vision sensor attached to a tip end of an arm of the robot, when the vision sensor is arranged, by being translated by operation of the robot, at a predetermined position with respect to each of three or more reference points that are provided on one of the work target object and the holding device and that are not arranged on one straight line, a second step, after the relocation, of measuring the three-dimensional position of the tip end of the robot based on the visual information acquired, by the vision sensor attached to the tip end of the arm of the robot, when the vision sensor is arranged, by being translated by operation of the robot, at a predetermined position with respect to each of the three or more reference points that are provided on one of the work target object and the holding device and that are not arranged on one straight line, a third step of calculating a relative position, with respect to one of the reference points, of each of other reference points before and after the relocation, and a fourth step of correcting a teaching point position in an operation program of the robot in such a way that a change in relative positions of the robot and the holding device is compensated for, based on relative positions of the reference points before and after the relocation calculated in the third step.

DETAILED DESCRIPTION

Hereinafter, a teaching position correction device 1 according to an embodiment of the present invention will be described with reference to the drawings.

Figure 1:
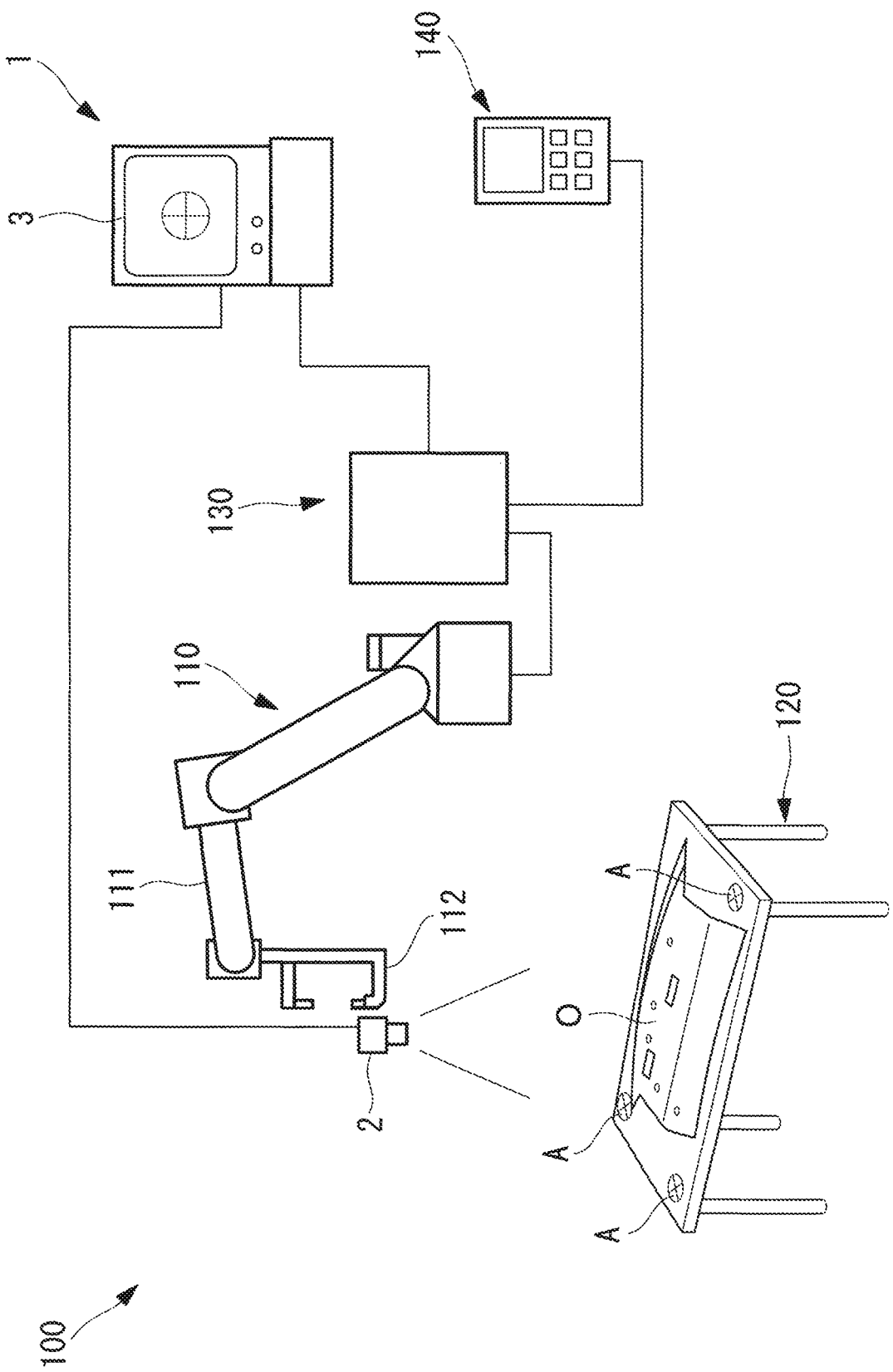
FIG. 1 is an overall configuration diagram showing a teaching position correction device according to an embodiment of the present invention.

As shown in FIG. 1, the teaching position correction device 1 according to the present embodiment is applied to a robot system 100 including a robot 110 having a work tool, such as a welding gun 112, attached to a tip end of a robot arm (arm) 111, and a holding device 120 that detachably holds a work target object O, which is to be worked by the robot 110, such as a sheet metal panel which is to be welded by the welding gun 112.

In the example shown in FIG. 1, the robot 110 is a 6-axis articulated type robot, and is connected to a control device 130 and is operated according to an operation program stored in the control device 130. A teach pendant 140 to be operated by a user is connected to the control device 130, and the robot 110 can be manually operated (jog operation) when a user operates the teach pendant 140 at the time of teaching of the operation program, for example.

The holding device 120 is a jig including a clamp mechanism that detachably fixes the work target object O. The work target object O is to be held while being accurately positioned on the holding device 120, and the same is true for after relocation, as will be described later.

Figure 2:
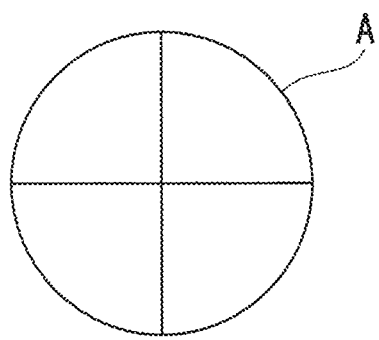
FIG. 2 is a diagram showing an example of a reference mark provided at the teaching position correction device in FIG. 1.

A reference mark (reference point) A, which can be read by a vision sensor 2 described later, is provided at three positions which are on an upper surface of the holding device 120, for example, and which are not arranged on one straight line. Any mark may be used as the reference mark A, but for example, a circle with a cross at the center is used, as shown in FIG. 2.

The teaching position correction device 1 according to the present embodiment includes a vision sensor 2, such as a CCD camera, which is fixed to the tip end, such as the welding gun 112, of the robot arm 111, and which acquires a two-dimensional image (visual information). The vision sensor 2 is detachably attached to the welding gun 112 by a suitable attachment means such as a permanent magnet. In the drawing, a reference sign 3 is a monitor that displays the two-dimensional image acquired by the vision sensor 2.

Furthermore, the teaching position correction device 1 according to the present embodiment includes a position measurement unit (not shown) that measures a three-dimensional position of the tip end of the robot 110 based on the two-dimensional image acquired by the vision sensor 2 when the vision sensor 2 is arranged at a predetermined position with respect to each reference mark A, and a relative position calculation unit (not shown) that calculates the relative positions of other reference marks A with respect to one reference mark A, based on the three-dimensional position of each reference mark A acquired by the position measurement unit during translation of the robot 110.

Target values of the position and the size of the reference mark A to be arranged on a two-dimensional image are set in the position measurement unit. For example, a position at which an intersection point of the cross of the reference mark A comes at a center of the two-dimensional image is set for the target position, and an outer diameter dimension of the circle of the reference mark A is set for the target size.

That is, the position measurement unit operates at a measurement start orientation, reached by a jog operation of the robot 110 by a user, including any of the reference marks A on the holding device 120 in a field of view of the vision sensor 2. The position measurement unit causes the robot 110 to perform a so-called visual touch-up operation of translating the vision sensor 2 until the reference mark A in the two-dimensional image is at the target position and with the target size, and stores a position (coordinate value) and an orientation (angle value) of a mechanical interface (end effector) of the robot 110 in an origin coordinate system of the robot 110, based on a value of an encoder (not shown) on each axis of the robot 110 at the end of the visual touch-up operation. Additionally, it is sufficient if the orientation is stored for just one reference mark A.

In the visual touch-up operation, the robot 110 is translated subtly in each of directions along X, Y, Z axes in the origin coordinate system while maintaining constant the orientation of the vision sensor 2 at the measurement start orientation at which the reference mark A is in the field of view. This allows grasping of what change is caused in the position and the size of the reference mark A in the two-dimensional image by movement of the robot 110 in which direction.

That is, movement of a center position of the reference mark A in the two-dimensional image indicates movement of the vision sensor 2 relative to the reference mark A in a direction orthogonal to an optical axis of the vision sensor 2, and a change in the size of the reference mark A in the two-dimensional image indicates movement of the vision sensor 2 relative to the reference mark A in a direction along the optical axis.

Then, acquisition of the two-dimensional image, acquisition of the position and the size of the reference mark A in the image, and translation of the robot 110 for causing the acquired position and size to come close to the target position and the target size are repeated. The position and the size of the reference mark A in the two-dimensional image may thereby be made to converge to the target values.

Moreover, when the robot 110 is operated, by a jog operation of the robot 110 by the user, to translate while maintaining the orientation of the vision sensor 2, the relative position calculation unit calculates, for other reference marks A, the relative positions of the reference marks A with respect to one reference mark A, based on the positions of the other reference marks A stored in the same manner by the position measurement unit.

The teaching position correction device 1 according to the present embodiment calculates a transform matrix for rotational component based on the relative position of each reference mark A calculated by the relative position calculation unit based on the position stored by the position measurement unit before and after relocation, calculates a transform matrix for translational component based on the orientation stored by the position measurement unit for one of the reference marks A, and corrects a teaching point position in the operation program by using the calculated transform matrices.

Next, a teaching position correction method according to the present embodiment will be described in detail.

The teaching position correction method according to the present embodiment includes steps that are performed before relocation and steps that are performed after relocation.

Figure 3:
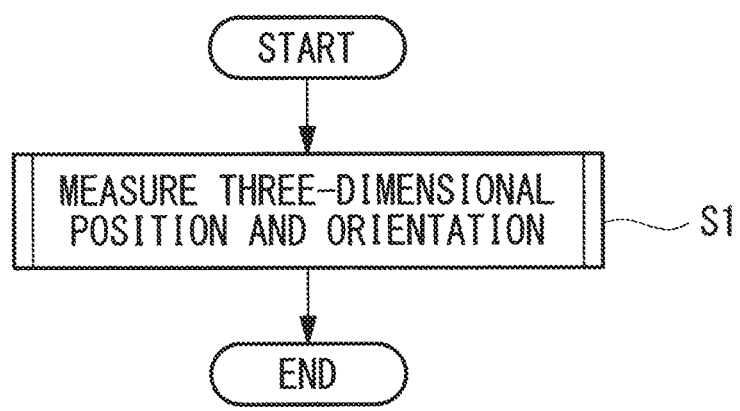
FIG. 3 is a flowchart showing a step before relocation in a teaching position correction method performed by using the teaching position correction device in FIG. 1.

As shown in FIG. 3, in a state before relocation of the robot 110 when the operation program is taught, the three-dimensional position and the orientation are measured for three reference marks A (first step S1).

Figure 5:
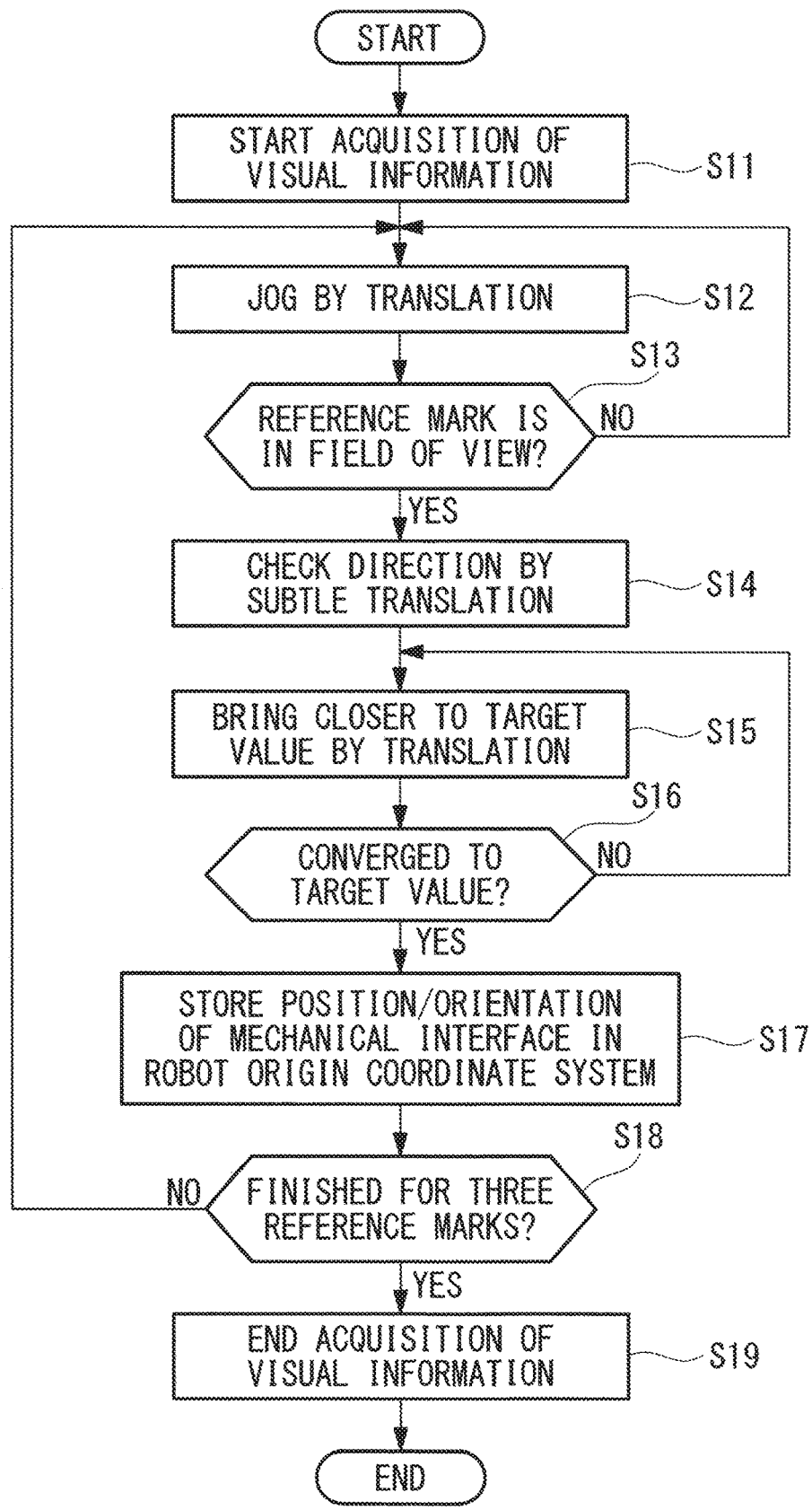
FIG. 5 is a flowchart describing a measurement routine for a three-dimensional position and an orientation in FIGS. 3 and 4.

As shown in FIG. 5, in the three-dimensional position measurement, operation of the vision sensor 2 is started (step S11), the robot 110 is jogged (step S12) by a jog operation of the teach pendant 140 performed while checking the two-dimensional image displayed on the monitor 3, and one of the reference marks A is arranged in the field of view of the vision sensor 2 (step S13).

The visual touch-up operation is performed in this state.

In the visual touch-up operation, first, the robot 110 is translated subtly in each of directions along X, Y, Z axes in the origin coordinate system while maintaining constant the orientation of the vision sensor 2 at the measurement start orientation at which the reference mark A is in the field of view (step S14). What change is caused in the position and the size of the reference mark A in the two-dimensional image by movement of the robot 110 in which direction is thereby checked. Next, the robot 110 is translated according to a check result such that the position and the size of the reference mark A come close to target values due to the translation (step S15).

Whether the position and the size of the reference mark A in the two-dimensional image are converged to the target values or not is thus determined, and when the position and the size are converged to the target values, the visual touch-up operation is ended (step S16). Steps from step S15 are repeated until the position and the size of the reference mark A in the two-dimensional image are converged to the target values. The position measurement unit stores the position (coordinate value) and an orientation (angle value) of the mechanical interface of the robot 110 in the origin coordinate system of the robot 110, based on a value of the encoder on each axis of the robot 110 at the end of the visual touch-up operation (step S17). Then, this operation is performed until the three reference marks A have been subjected to the operation (step S18), and acquisition of the visual information is then ended (step S19).

Three coordinate values (three-dimensional positions) $P_{A1}=(X_{A1}, Y_{A1}, Z_{A1})$, $P_{A2}=(X_{A2}, Y_{A2}, Z_{A2})$, $P_{A3}=(X_{A3}, Y_{A3}, Z_{A3})$ are acquired and stored by the three-dimensional position measurement.

Moreover, for example, in the visual touch-up operation for the first reference mark A in the first step S1, a positional orientation (orientation) $W_A$ of the mechanical interface of the robot 110 is also acquired and stored at the same time as acquisition of the coordinate value $P_{A1}$.

Figure 4:
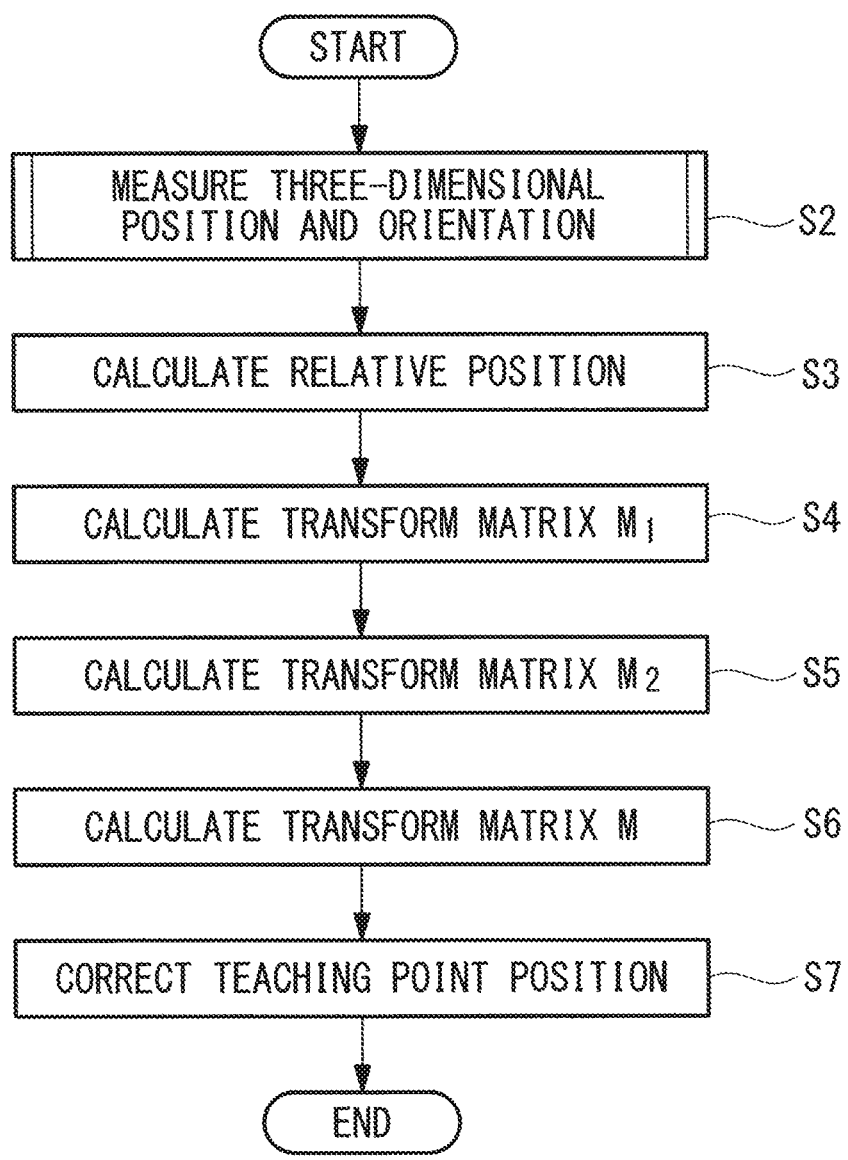
FIG. 4 is a flowchart showing steps after relocation in the teaching position correction method performed by using the teaching position correction device in FIG. 1.

As shown in FIG. 4, in the case where at least one of the robot 110 and the holding device 120 is relocated in this state, the three-dimensional position measurement and measurement of the orientation are performed again after relocation, by the position measurement unit, for the three reference marks A in the same manner as in the first step S1, and three coordinate values $P_{B1}=(X_{B1}, Y_{B1}, Z_{B1})$, $P_{B2}=(X_{B2}, Y_{B2}, Z_{B2})$, $P_{B3}=(X_{B3}, Y_{B3}, Z_{B3})$, and a positional orientation $W_B$ are acquired and stored (second step S2). The second step S2 is performed according to the flowchart shown in FIG. 5, in the same manner as the first step S1.

Then, calculation of the relative positions by the relative position calculation unit is performed based on the coordinate values acquired before and after relocation (third step S3), and a transform matrix $M_1$ for rotational component is calculated based on the calculated relative position (step S4).

Moreover, a transform matrix $M_2$ for translational component is calculated based on the calculated transform matrix $M_1$, and the positional orientations $W_A$, $W_B$ acquired before and after relocation (step S5). Then, a transform matrix $M=M_2M_1$ is calculated based on these transform matrices (step S6), and each teaching point position in the operation program before relocation is corrected by using the calculated transform matrix M (fourth step S7).

Now, calculation of the transform matrix $M_1$ for rotational component will be specifically described.

The three coordinate values acquired for the reference marks A before relocation include a vector value $P_C=(X_C, Y_C, Z_C)$ dependent on an attachment position and an attachment orientation of the vision sensor 2 to the robot 110 before relocation and the target values of the position and the size in the two-dimensional image at the time of visual touch-up operation, and are expressed as $P_{A1}+P_C$, $P_{A2}+P_C$, $P_{A3}+P_C$. The vector value $P_C$ here is unknown.

In the same manner, the three coordinate values acquired for the reference marks A after relocation also include a vector value $P_D=(X_D, Y_D, Z_D)$ dependent on an attachment position and an attachment orientation of the vision sensor 2 to the robot 110 after relocation and the target values of the position and the size in the two-dimensional image at the time of visual touch-up operation, and are expressed as $P_{B1}+P_D$, $P_{B2}+P_D$, $P_{B3}+P_D$. The vector value $P_D$ here is unknown.

Accordingly, a transform matrix M which satisfies the following is to be determined:

$$P_{B1}+P_D=M(P_{A1}+P_C),$$

$$P_{B2}+P_D=M(P_{A2}+P_C),$$

$$P_{B3}+P_D=M(P_{A3}+P_C).$$

A transform matrix $W_1$ representing the position and the orientation of the work target object O before relocation is given by Math. 1.

$$W_1 = \begin{pmatrix} n_1 & o_1 & a_1 & l_1 \\ 0 & 0 & 0 & 1 \end{pmatrix} \quad \{\text{Math. 1}\}$$

Each component value of the transform matrix $W_1$ is as follows.

The following is true: $l_1=P_{A1}+P_C$. That is, a coordinate value measured for a first reference mark A is given as a position $l_1$ of the work target object O.

A direction from the first reference mark A to a second reference mark A is given as an X-axis direction of an orientation of the work target object O, and a direction vector $u_1$ in the X-axis direction is calculated by the following equation.

$$u_1=(P_{A2}+P_C)-(P_{A1}+P_C)=P_{A2}-P_{A1}$$

Moreover, a unit vector $n_1$ of the direction vector $u_1$ in the X-axis direction is calculated by the following equation.

$$n_1=u_1/|u_1|$$

A direction vector $q_1$ from the coordinate value measured for the first reference mark A to a third reference mark A is calculated by the following equation.

$$q_1=(P_{A3}+P_C)-(P_{A1}+P_C)=P_{A3}-P_{A1}$$

If $r_1=n_1\times q_1$ (outer product of $n_1$ and $q_1$) is true, $r_1$ is a direction vector in a Z-axis direction orthogonal to both $n_1$ and $q_1$, and its unit vector $a_1$ is calculated by the following equation.

$$a_1=r_1/|r_1|$$

Lastly, a Y-axis direction of the orientation of the work target object O is determined by $o_1=a_1\times n_1$ (outer product of $a_1$ and $n_1$).

In the same manner, a transform matrix $W_2$ representing the position and the orientation of the work target object O after relocation is given by Math. 2.

$$W_2 = \begin{pmatrix} n_2 & o_2 & a_2 & l_2 \\ 0 & 0 & 0 & 1 \end{pmatrix} \quad \{\text{Math. 2}\}$$

As in the case of the transform matrix $W_1$, each component value of the transform matrix $W_2$ is as follows.

$$l_2=P_{B1}+P_D$$

$$u_2=(P_{B2}+P_D)-(P_{B1}-P_D)=P_{B2}-P_{B1}$$

$$n_2=u_2/|u_2|$$

$$q_2=(P_{B3}+P_D)-(P_{B1}+P_D)=P_{B3}-P_{B1}$$

$$r_2=n_2\times q_2$$

$$a_2=r_2/|r_2|$$

$$o_2=a_2\times n_2$$

Here, the transform matrix M is obtained by the following:

$$M=\text{inv}(W_2)\cdot W_1,$$

where $\text{inv}(W_2)$ is an inverse matrix of $W_2$.

In the calculation above, only $l_1$, $l_2$ are dependent on $P_C$, $P_D$, and thus, transform matrices $V_1$, $V_2$ from which $l_1$, $l_2$ are removed are defined by Math. 3, Math. 4, and the transform matrix $M_1$ for rotational component can be determined by the following:

$$M_1 = inv(V_2) \cdot V_1.$$

$$V_1 = \begin{pmatrix} n_1 & o_1 & a_1 & 0 \\ 0 & 0 & 0 & 1 \end{pmatrix} \quad \{\text{Math. 3}\}$$

$$V_2 = \begin{pmatrix} n_2 & o_2 & a_2 & 0 \\ 0 & 0 & 0 & 1 \end{pmatrix} \quad \{\text{Math. 4}\}$$

Next, calculation of the transform matrix $M_2$ for translational component will be described.

The positional orientation $W_A$ acquired for one reference mark A before relocation is a positional orientation after translation of the positional orientation $P_1$ at a time when the visual touch-up operation was started (i.e. the orientation component is the same), and thus, $M_1 W_A$ is the same as a positional orientation after translation of $M_1 P_1$.

Likewise, the positional orientation $W_B$ acquired for the same reference mark A after relocation is a positional orientation after translation of the positional orientation $P_2 = M_1 P_1$ at a time when the visual touch-up operation was started (i.e. the orientation component is the same), and thus, the orientation component is the same between $M_1 W_A$ and $W_B$, and if $M_2 = W_B \cdot inv(M_1 W_A)$ is given, the transform matrix $M_2$ for translation is as given as Math. 5.

$$M_2 = \begin{pmatrix} 1 & 0 & 0 & t_1 \\ 0 & 1 & 0 & t_2 \\ 0 & 0 & 1 & t_3 \\ 0 & 0 & 0 & 1 \end{pmatrix} \quad \{\text{Math. 5}\}$$

Because $M_1$, $W_A$, $W_B$ are known, the transform matrix $M_2$ can be calculated.

With the transform matrix $M_2$, only translation is performed and rotation is not performed, and thus, the rotational components of the transform matrix $M_1$ and the transform matrix $M_2 \cdot M_1$ coincide with each other.

Moreover, the rotational components of the transform matrix M and the transform matrix $M_1$ coincide with each other, and thus, the rotational components of the transform matrix M and the transform matrix $M_2 \cdot M_1$ coincide with each other.

The positional orientation $W_A$ acquired before relocation is acquired by the visual touch-up operation, and thus, based on the definition of the transform matrix M, a positional orientation $MW_A$ is a positional orientation at which the visual touch-up operation is performed on the corresponding reference mark A after relocation. Moreover, the positional orientation $W_B (=M_2 M_1 W_A)$ acquired after relocation is also the positional orientation at which the visual touch-up operation is performed on the corresponding reference mark A, and when coordinates of the center of the reference mark A on a mechanical interface coordinate system are given as $T=(X_t, Y_t, Z_t)$, both $MW_A T$ and $M_2 M_1 W_A T$ are supposed to represent a coordinate value of a center position of the reference mark A after relocation and should coincide with each other.

That is, based on $$MW_A T = M_2 M_1 W_A T,$$

it can be assumed that the following is true:

$$inv(M_2 M_1) MW_A T = W_A T$$

The rotational components of the transform matrix M and the transform matrix $M_2 M_1$ coincide with each other, and thus, the rotational component of $inv(M_2 M_1) M$ is a unit matrix as represented by Math. 6.

$$inv(M_2 M_1) M = \begin{pmatrix} 1 & 0 & 0 & s_1 \\ 0 & 1 & 0 & s_2 \\ 0 & 0 & 1 & s_3 \\ 0 & 0 & 0 & 1 \end{pmatrix} \quad \{\text{Math. 6}\}$$

Moreover, Math. 8 is obtained by defining $W_A T$ by Math. 7.

$$W_A T = \begin{pmatrix} k_1 \\ k_2 \\ k_3 \end{pmatrix} \quad \{\text{Math. 7}\}$$

$$\begin{pmatrix} k_1 + s_1 \\ k_2 + s_2 \\ k_3 + s_3 \end{pmatrix} + \begin{pmatrix} k_1 \\ k_2 \\ k_3 \end{pmatrix} \quad \{\text{Math. 8}\}$$

As a result, $s_1 = s_2 = s_3 = 0$ in Math. 6 is determined and Math. 9 is established, and thus, $M = M_2 \cdot M_1$ is established.

$$inv(M_2 M_1) M = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad \{\text{Math. 9}\}$$

As described above, the teaching position correction device 1 according to the present embodiment achieves an advantage effect that, based on the fact that relative positions of three or more reference marks A provided on the holding device 120 do not change, the teaching point position in the operation program taught before relocation can be easily corrected without performing calibration of the vision sensor 2 with respect to the robot 110. Accordingly, the work target object O can be worked after relocation in the same manner as before relocation.

Particularly, because calibration of the vision sensor 2 with respect to the robot 110 is not necessary, an operation of greatly moving the hand tip of the robot 110, which is required for calibration, does not have to be performed, and interference between a work tool and a mechanism portion of the robot 110 or a peripheral equipment may be prevented.

Additionally, in the present embodiment, the reference marks A are provided on the holding device 120, but the reference marks A may alternatively be provided on the work target object O, which is to be held by the holding device 120. Moreover, a circle with a cross at the center is illustrated as the reference mark A, but any mark allowing specification of the size and a specific position (such as a point having a characteristic shape) may alternatively be used.

Furthermore, instead of providing the reference marks A, a part, of the holding device 120 or the work target object O, having a characteristic shape may be used as a reference point. Such a reference point is a corner portion or a protruding portion, for example.

Furthermore, the number of positions where the reference marks A are provided may be more than three, without being limited to three.

Moreover, in the present embodiment, orientations set in the case of performing the visual touch-up operation on one reference mark A are illustrated as the orientations $W_A$, $W_B$ for determining the transform matrix $M_2$ for translational component, but one point different from the reference mark A may alternatively be used.

Furthermore, in the present embodiment, a 6-axis articulated type robot is illustrated as the robot 110, but application to any robot is possible, without being limited to the 6-axis articulated type robot.

From the above-described embodiment, the following invention is derived.

An aspect of the present invention provides a teaching position correction device including a vision sensor, attached to a tip end of an arm of a robot, that acquires visual information, a position measurement unit that measures a three-dimensional position of the tip end of the robot based on the visual information acquired by the vision sensor when the vision sensor is arranged at a predetermined position with respect to each of three or more reference points that are provided on one of a work target object to be worked by the robot and a holding device that holds the work target object and that are not arranged on one straight line, and a relative position calculation unit that calculates a relative position, with respect to one of the reference points, of each of other reference points, based on the three-dimensional position that is measured by the position measurement unit while the vision sensor is translated by operation of the robot, where a teaching point position in an operation program of the robot is corrected in such a way that a change in relative positions of the robot and the holding device is compensated for, based on relative positions of the reference points calculated by the relative position calculation unit before and after relocation of at least one of the robot and the holding device.

According to the present aspect, the robot is installed with respect to a work target object held by the holding device, and a teaching point in the operation program of the robot is taught, and then, the vision sensor is attached to the tip end of the arm of the robot, and the three-dimensional position of the tip end of the robot is measured by the position measurement unit, while the vision sensor is translated by operation of the robot, based on the visual information acquired by the vision sensor when the vision sensor is arranged at a predetermined position with respect to each of the three or more reference points that are provided on one of the work target object and the holding device and that are not arranged on one straight line, and the relative positions, with respect to one of the reference points, of other reference points are calculated by the relative position calculation unit.

Then, in the same manner as before relocation, after at least one of the robot and the holding device is relocated, the vision sensor is attached to the tip end of the arm of the robot, and the three-dimensional position of the tip end of the robot is measured by the position measurement unit, while the vision sensor is translated by operation of the robot, based on the visual information acquired by the vision sensor when the vision sensor is arranged at a predetermined position with respect to each of the reference points, and the relative positions, with respect to one of the reference points, of other reference points are calculated by the relative position calculation unit.

In this manner, the teaching point position in the operation program of the robot is corrected based on the calculated relative positions of the reference points before and after relocation, in such a way that a change in relative positions of the robot and the holding device is compensated for.

That is, based on the fact that relative positions of three or more reference points provided on the work target object or the holding device do not change, the teaching point position in the operation program taught before relocation can be easily corrected without performing calibration of the vision sensor with respect to the robot.

In the aspect described above, a transform matrix for rotational component for the teaching point position before and after the relocation may be calculated based on the relative positions of the reference points calculated by the relative position calculation unit before and after the relocation, and the teaching point position may be corrected by using the transform matrix.

Accordingly, even if the position of the vision sensor is changed, due to removal or attachment of the vision sensor to the robot, during measurement by the vision sensor before and after relocation, a transform matrix which accurately determines the rotational component for the teaching point position before and after relocation may be calculated, and the teaching point position may be accurately corrected.

Furthermore, in the aspect described above, the three-dimensional position and an orientation of the tip end of the robot when the vision sensor is arranged at a predetermined position with respect to one of the reference points may be measured by the position measurement unit before and after the relocation, a transform matrix for translational component for the teaching point position before and after the relocation may be calculated based on a measured orientation component of the tip end of the robot before and after the relocation and the transform matrix for rotational component, and the teaching point position may be corrected by using the transform matrix for translational component.

Accordingly, even if the position and the orientation of the vision sensor are changed, due to removal or attachment of the vision sensor to the robot, during measurement by the vision sensor before and after relocation, a transform matrix which accurately determines the translational component for the teaching point position before and after relocation may be calculated, and the teaching point position may be accurately corrected.

Furthermore, in the aspect described above, the reference points may be points having a shape characteristic to the holding device or the work target object.

Moreover, in the aspect described above, the reference points may be reference marks provided on the holding device or the work target object.

Moreover, another aspect of the present invention provides a teaching position correction method including a first step, before relocation of at least one of a robot and a holding device that holds a work target object that is to be worked by the robot, of measuring a three-dimensional position of a tip end of the robot based on visual information acquired, by a vision sensor attached to a tip end of an arm of the robot, when the vision sensor is arranged, by being translated by operation of the robot, at a predetermined position with respect to each of three or more reference points that are provided on one of the work target object and the holding device and that are not arranged on one straight line, a second step, after the relocation, of measuring the three-dimensional position of the tip end of the robot based on the visual information acquired, by the vision sensor attached to the tip end of the arm of the robot, when the vision sensor is arranged, by being translated by operation of the robot, at a predetermined position with respect to each of the three or more reference points that are provided on one of the work target object and the holding device and that are not arranged on one straight line, a third step of calculating a relative position, with respect to one of the reference points, of each of other reference points before and after the relocation, and a fourth step of correcting a teaching point position in an operation program of the robot in such a way that a change in relative positions of the robot and the holding device is compensated for, based on relative positions of the reference points before and after the relocation calculated in the third step.

In the aspect described above, in the fourth step, a transform matrix for rotational component for the teaching point position before and after the relocation may be calculated based on the relative positions of the reference points calculated before and after the relocation, and the teaching point position may be corrected by using the transform matrix.

Furthermore, in aspect described above, in the first step and the second step, the three-dimensional position and an orientation of the tip end of the robot when the vision sensor is arranged at a predetermined position with respect to one of the reference points may be measured, and in the fourth step, a transform matrix for translational component for the teaching point position before and after the relocation may be calculated based on a measured orientation component of the tip end of the robot before and after the relocation and the transform matrix for rotational component, and the teaching point position may be corrected by using the transform matrix for translational component.

REFERENCE SIGNS LIST 1 teaching position correction device
2 vision sensor
110 robot
111 robot arm (arm)
120 holding device
A reference mark (reference point)
O work target object
M, $M_1$, $M_2$, $M_3$ transform matrix
$P_{A1}$, $P_{A2}$, $P_{A3}$, $P_{B1}$, $P_{B2}$, $P_{B3}$ coordinate value (three-dimensional position)
$W_A$, $W_B$ positional orientation (orientation)
S1 first step
S2 second step
S3 third step
S7 fourth step

The invention claimed is:

1. A teaching position correction device comprising:
a vision sensor attached to a tip end of an arm of a robot, wherein the teaching position correction device is configured to:
measure a three-dimensional position of the tip end of the robot based on visual information acquired by the vision sensor when the vision sensor is arranged at a predetermined position with respect to each of three or more reference points that are provided on one of a work target object to be worked by the robot and a holding device that holds the work target object and that are not arranged on one straight line;
calculate a relative position, with respect to one of the reference points, of each of other reference points, based on the measured three-dimensional position while the vision sensor is translated by operation of the robot; and
correct a teaching point position in an operation program of the robot in such a way that a change in relative positions of the robot and the holding device is compensated for, based on calculated relative positions of the reference points before and after relocation of at least one of the robot and the holding device.

2. The teaching position correction device according to claim 1, wherein the teaching position correction device is configured to:
calculate a transform matrix for rotational component for the teaching point position before and after the relocation based on the calculated relative positions of the reference points before and after the relocation; and
correct the teaching point position by using the transform matrix.

3. The teaching position correction device according to claim 2, wherein the teaching position correction device is configured to:
measure the three-dimensional position and an orientation of the tip end of the robot when the vision sensor is arranged at a predetermined position with respect to one of the reference points before and after the relocation;
calculate a transform matrix for translational component for the teaching point position before and after the relocation based on a measured orientation component of the tip end of the robot before and after the relocation and the transform matrix for rotational component; and
correct the teaching point position by using the transform matrix for translational component.

4. The teaching position correction device according to claim 1, wherein the reference points are points having a shape characteristic to the holding device or the work target object.

5. The teaching position correction device according to claim 1, wherein the reference points are reference marks provided on the holding device or the work target object.

6. A teaching position correction method comprising:
a first step, before relocation of at least one of a robot and a holding device that holds a work target object that is to be worked by the robot, of measuring a three-dimensional position of a tip end of the robot based on visual information acquired, by a vision sensor attached to a tip end of an arm of the robot, when the vision sensor is arranged, by being translated by operation of the robot, at a predetermined position with respect to each of three or more reference points that are provided on one of the work target object and the holding device and that are not arranged on one straight line;
a second step, after the relocation of at least one of the robot and the holding device, of measuring the three-dimensional position of the tip end of the robot based on the visual information acquired, by the vision sensor attached to the tip end of the arm of the robot, when the vision sensor is arranged, by being translated by operation of the robot, at a predetermined position with respect to each of the three or more reference points that are provided on one of the work target object and the holding device and that are not arranged on one straight line;
a third step of calculating a relative position, with respect to one of the reference points, of each of other reference points before and after the relocation; and
a fourth step of correcting a teaching point position in an operation program of the robot in such a way that a change in relative positions of the robot and the holding device is compensated for, based on relative positions of the reference points before and after the relocation calculated in the third step.

7. The teaching position correction method according to claim 6, wherein, in the fourth step, a transform matrix for rotational component for the teaching point position before and after the relocation is calculated based on the relative positions of the reference points calculated before and after the relocation, and the teaching point position is corrected by using the transform matrix.

8. The teaching position correction method according to claim 7, wherein
in the first step and the second step, the three-dimensional position and an orientation of the tip end of the robot when the vision sensor is arranged at a predetermined position with respect to one of the reference points are measured, and
in the fourth step, a transform matrix for translational component for the teaching point position before and after the relocation is calculated based on a measured orientation component of the tip end of the robot before and after the relocation and the transform matrix for rotational component, and the teaching point position is corrected by using the transform matrix for translational component.

9. A teaching position correction device, wherein the teaching position correction device is configured to:
measure a three-dimensional position of a tip end of a robot based on visual information acquired by a vision sensor attached to a tip end of an arm of the robot, when the vision sensor is arranged at a predetermined position with respect to each of three or more reference points that are provided on one of a work target object to be worked by the robot and a holding device that holds the work target object and that are not arranged on one straight line;
calculate a relative position, with respect to one of the reference points, of each of other reference points, based on the measured three-dimensional position while the vision sensor is translated by operation of the robot; and
correct a teaching point position in an operation program of the robot in such a way that a change in relative positions of the robot and the holding device is compensated for, based on calculated relative positions of the reference points before and after relocation of at least one of the robot and the holding device.

* * * * *